United States Patent
Modes et al.

(10) Patent No.: US 7,551,083 B2
(45) Date of Patent: Jun. 23, 2009

(54) SYSTEMS, METHODS AND DEVICES FOR AREA-BASED LOCALIZATION

(76) Inventors: Jerold Russell Modes, 186 Morgan Pl., Castle Rock, CO (US) 80108; Timothy X Brown, 1415 Patton Dr., Boulder, CO (US) 80303; Daniel Elchanon Epel, 11905 E. Ida Cir., Englewood, CO (US) 80111

( * ) Notice: Subject to any disclaimer, the term of this patent is extended or adjusted under 35 U.S.C. 154(b) by 184 days.

(21) Appl. No.: 11/256,351

(22) Filed: Oct. 20, 2005

(65) Prior Publication Data

US 2006/0092016 A1   May 4, 2006

Related U.S. Application Data (60) Provisional application No. 60/620,650, filed on Oct. 20, 2004.

(51) Int. Cl.
*G08B 13/14* (2006.01)

(52) U.S. Cl. .............................. 340/572.1; 340/539.13; 340/573.1; 340/10.1; 340/10.51; 455/456.1

(58) Field of Classification Search ............. 340/572.1, 340/572.7, 573.1, 573.4, 539.11, 539.13, 340/10.1, 10.2, 10.51; 455/456, 456.1
See application file for complete search history.

(56) References Cited

U.S. PATENT DOCUMENTS

| | | | | |
|---|---|---|---|---|
| 5,317,309 | A * | 5/1994 | Vercellotti et al. | 340/10.5 |
| 6,317,049 | B1 * | 11/2001 | Toubia et al. | 340/573.4 |
| 6,774,797 | B2 * | 8/2004 | Freathy et al. | 340/573.1 |
| 6,998,985 | B2 * | 2/2006 | Reisman et al. | 340/573.1 |
| 7,064,670 | B2 * | 6/2006 | Galperin et al. | 340/573.4 |
| 7,116,230 | B2 * | 10/2006 | Klowak | 340/572.1 |
| 7,155,239 | B2 * | 12/2006 | Zeng et al. | 455/456.1 |

* cited by examiner

*Primary Examiner*—Davetta W Goins
(74) *Attorney, Agent, or Firm*—Hensley Kim & Holzer, LLC (57) ABSTRACT

An improved compact, secure localization tag useful for identifying and tracking the tag in an environment comprising discrete areas is disclosed. Further, systems and methods for area-based localization of tags using received signal strengths is also disclosed. Tracking the location of an asset can be facilitated by attaching a tag that transmits a beacon signal to the asset. The beacon signal can be received and measured by beacon receivers so as to locate the asset and the attached tag.

20 Claims, 4 Drawing Sheets

SYSTEMS, METHODS AND DEVICES FOR AREA-BASED LOCALIZATION

RELATED APPLICATIONS

This application claims the benefit of U.S. Provisional Application No. 60/620,650, entitled "Systems, methods and devices for area-based localization" and filed on Oct. 20, 2004, specifically incorporated herein in its entirety for all that it discloses and teaches.

TECHNICAL FIELD

The present invention is directed to an improved compact, secure localization tag useful for identifying and tracking the tag in an environment divided into discrete areas. The present invention is further directed to systems and methods for area-based localization using received signal strengths. Tracking the location of an asset can be facilitated by attaching a tag that transmits a beacon signal. The beacon signal can be received and measured by beacon receivers so as to locate the asset and the attached tag.

BACKGROUND

Tags that transmit beacon signals can be used to track a number of assets within a given, discrete area. The tags are attached to assets and are used to track the assigned assets within the area. A common problem with using beacon signals, however, is the collision of multiple beacon signals emanating from a number of tags. Previous methods to avoid these collisions include sending many complicated signals over a long time period. In order to avoid collisions from multiple beacons being sent in overlapping intervals, existing systems typically use one of two approaches; on demand querying and collision avoidance. In the on-demand approach, tags only transmit when they receive a probe from a beacon receiver. In the collision avoidance approach, the tag first listens to the medium and avoids transmitting when other tags are transmitting. Both of these approaches require the tag to have both a transmitter and a receiver. The receiver adds complexity and cost to the tag. These drawbacks have until now limited the size of the tag and greatly increased the overall cost of the tags and the system for monitoring the tags.

Further, in order to distinguish different assets, known tags typically embed a unique identification (ID) code assigned to the asset in their transmitted beacon signals. But, this may reveal proprietary information to an undesired person. Such a person could monitor the set of unique ID codes to determine the quantity of assets in an inventory. Changes in the set of ID codes may signal to an adversary changes in the inventory. If the adversary learned that a unique ID code is assigned to a particular asset then the adversary may use the beacon signal of the asset tag to surreptitiously track the asset.

SUMMARY OF THE INVENTION

In one embodiment, a localization tag is provided without a receiver. The elimination of the receiver, for example, decreases the cost of the tag versus other localization tags and further allows for a decrease in the power consumption and overall size of the localization tag. At least one additional feature is utilized to avoid unwanted collisions.

The tag, in one variation, transmits beacon signals comprising a short duration over predetermined intervals. The length of these beacon signals is typically minimized to include a limited amount of data.

In another variation, the beacon signals are transmitted less frequently over a given time period to further reduce the probability of unwanted collisions. The result is a very low duty cycle (e.g., a duty cycle of less than about one in a thousand) for each tag that makes collisions between tags unlikely. The duty cycle is the ratio of the time of the beacon signal transmission divided by the total period comprising a transmission period of the beacon signal and a wait period between beacon signal transmissions. For instance, a beacon signal sent once every minute and of a one millisecond duration would have a two tag collision probability of one in 30,000. Tags with similarly low duty cycles as in the previous example (1 in 60,000) would have similarly low collision probabilities.

To further eliminate problems with collisions, another variation of the present invention provides a mechanism for varying the interval between beacons by a random interval to eliminate repeated collisions in the chance instance that two tags happen to transmit beacon signals at the same time. The random time can be computed through any number of means. In one instance, a counter value is set to a number randomly chosen between a minimum and maximum value and the tag transmits a beacon signal when a clock has decremented the counter to zero. For example, the counter value could be set so that a tag transmits a beacon signal during an interval of duration between 50 and 70 seconds.

In another embodiment, a tag of the present invention comprises enhanced security capabilities. The tag, in one variation, transmits an ID code that changes in a predetermined sequence each time a beacon signal is sent. The sequence can be chosen so that it cannot be reliably predicted by an adversary. A number of pseudorandom number sequences and cryptographically secure sequences are known in the art that can serve this purpose. For example, a set of linear shift registers can generate a sequence of codes that appear random to the casual observer. The ID code in any one beacon from a tag need not be unique. Other tags could send the same ID code at the same or other times. In this variation, the sequence of codes is unique rather than the individual ID codes themselves. The length of the ID code is sufficient to further assure that the code at any single beacon time is likely to be unique and the sequence of codes over time are even more likely to be unique. As an example, if a 20 bit code is chosen, then it is approximately one in 1,000,000 that two tags chose the same unique ID code in a beacon interval and it is approximately one in 1,000,000,000,000 that this event occurs for two beacons in succession.

In another variation, an enhanced security capability of the tag allows for detecting if the tag has failed or has been removed from the device. Where the tag is battery operated, for example, a source of failure is when the tag battery is drained. Existing battery operated tag designs use replaceable batteries. This entails an accessible battery compartment so that the old battery can be removed and a new battery installed. This is an obvious security weakness since an adversary can simply remove the battery to disable the tag. The battery compartment can be made secure with a key or the like, but, this adds additional cost to the tag. A simpler alternative is to design the tag to be disposable. When the battery has drained, the tag is simply removed, disposed of, and a new tag is installed. A hermetically sealed tag with integrated battery further reduces the size and cost of the tag. The cost of the battery can be expected to be a large part of the cost of the simple tag in the present invention. In the preferred embodiment, the tag appends a low-battery indicator bit to the ID code. In this way, the beacon receiver can detect when the battery is low and alert the monitoring system. Alternatively, the predictable operation of the tag over time enables accurate estimates of battery usage in relation to battery capacity. In this embodiment, tag replacement times can be predicted and scheduled without any explicit battery indicator.

If the tag is attached to the asset with adhesive, rivets, a closed band, or the like, then it will need to be pried or cut from the asset in order to be removed. In one variation of a tag, a tamper circuit comprising an electrical loop of brittle wire, thin wire, or similar that is broken if the tag is pried or cut may be utilized. If the circuit is broken, the tag will beacon at more frequent intervals and a tamper bit appended to the unique code will be set, thereby emitting a beacon that identifies both the tag and the fact that it has been tampered with. This alerts the monitoring system so that the proper action may be taken to secure the asset.

In another variation, a tag may comprise the ability to emit beacon signals of varying signal strengths. Beacon receivers are configured to work in connection with the tags to measure the varying signal strengths emitted by a single tag to further gain information, including how close or far away the tag is from the beacon receiver. The beacon receiver may also have limited capabilities. A beacon receiver, for example, may comprise a limited fidelity and dynamic range on its signal strength measurement, or, it may only be able to detect if the beacon signal was received or not. The tag therefore provides an indirect measurement of how close or far it is from a beacon receiver in these cases. In this version of the tag, the tag varies its transmit power. If the tag can be received when it is transmitting at low power then it is closer to the receiver. If it can only be heard at higher transmit powers then it is further from the receiver. In one embodiment, the tag chooses from one of a predetermined set of transmit powers. If N is the number of transmit powers, the tag chooses one of the N different powers for each beacon signal. In one variation, the transmit power is encoded as a binary number and this number is appended to the tag ID. In another variation, the binary code for the transmit power is chosen based on a predetermined sequence and the binary code is not transmitted. Since the beacon receivers know this sequence and can compute the binary code themselves, the code is not necessary to be transmitted.

DETAILED DESCRIPTION

The Tag

Figure 1:
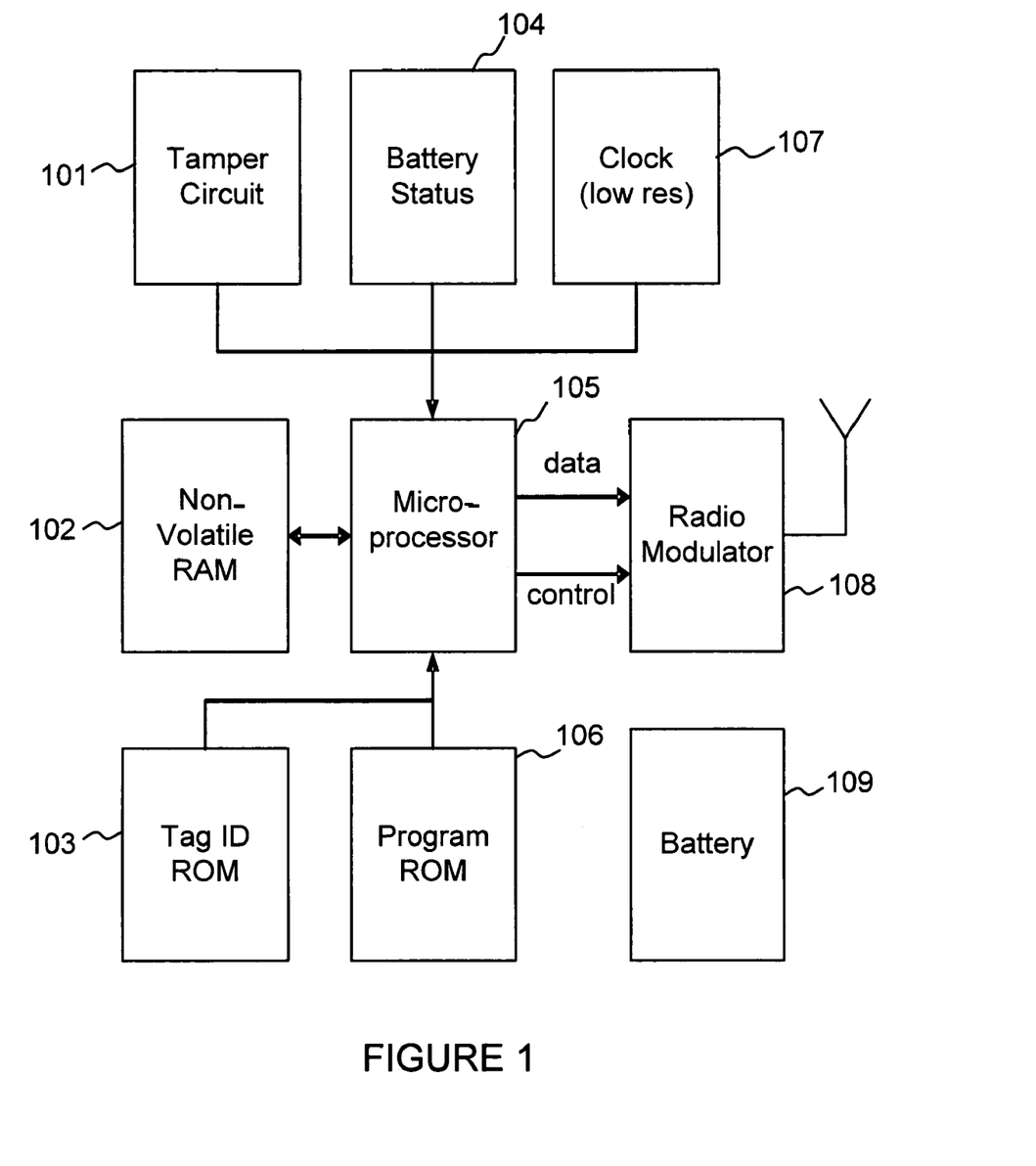
FIG. 1 illustrates a block diagram of an exemplary tag.

FIG. 1 shows a block diagram of an exemplary tag 100. The tag 100 comprises a tamper detection circuit 101 to detect if the tag has been tampered with. A battery status detector 104 detects if the battery charge is low. A clock 107 times microprocessor sleep events. A non-volatile random-access memory (RAM) 102 stores a current place in a tag ID sequence. A microprocessor 105 controls the operation of the tag. A radio modulator 108 transmits a beacon signal under the control of the microprocessor. The microprocessor 105, for example, may control the format, frequency, and/or power level of the beacon signal. A tag ID read-only memory (ROM) 103 stores a private key for a tag ID sequence generator. A program ROM 106 stores control instructions for the microprocessor. The battery 109 powers the tag.

Figure 2:
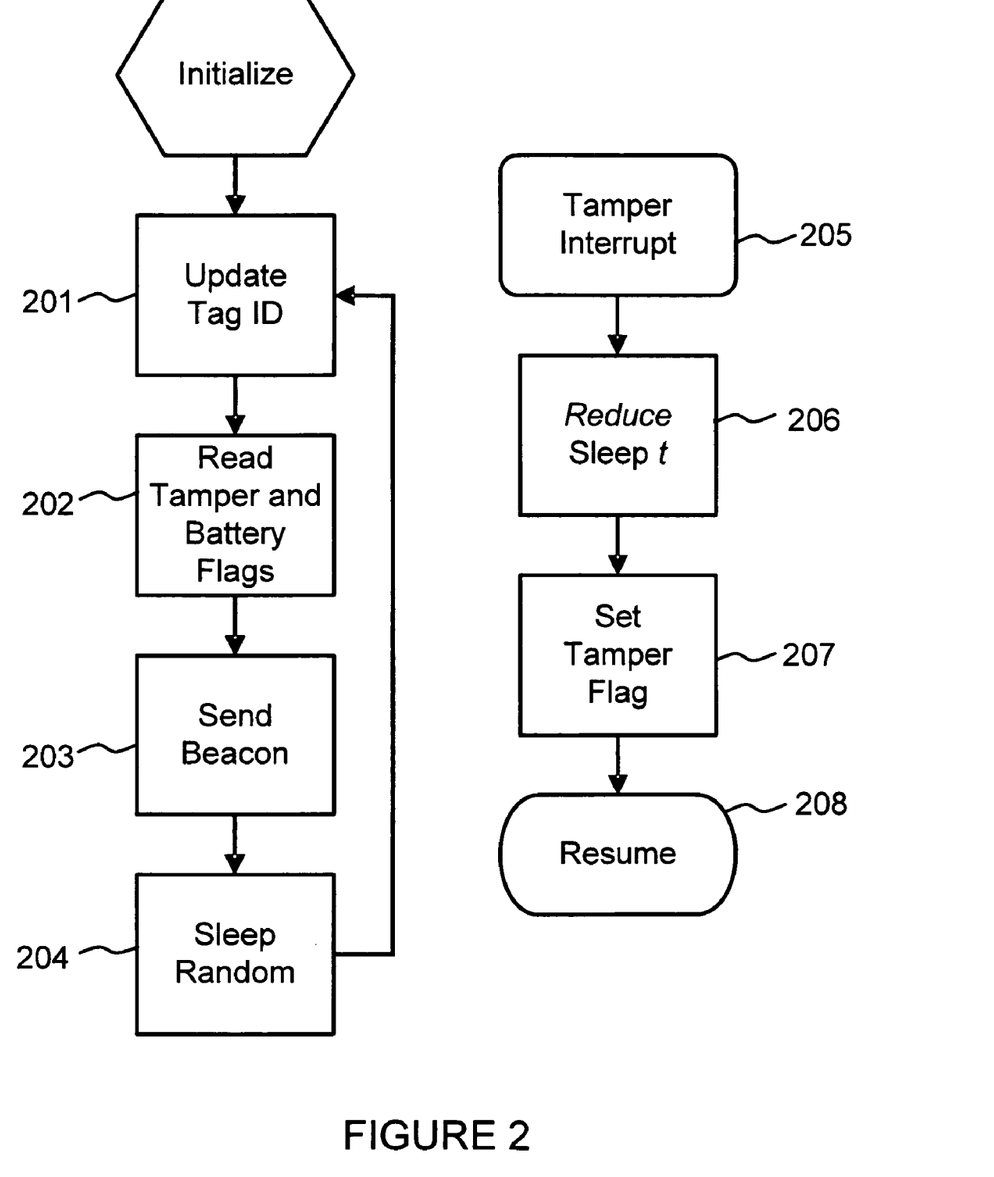
FIG. 2 illustrates a method of operation for an exemplary tag.

The tag microprocessor 105 operates in a continuous loop. FIG. 2 shows a process of operation for the tag 100. Operations of the method may be performed under the control of the microprocessor 105 of the tag. As shown in FIG. 2, a new tag ID is generated in operation 201 according to a pseudo-random number sequence. If necessary, a transmit power level can also be generated. A status of the battery status detector and/or the tamper detection circuit is read in operation 202. The beacon signal comprising the tag ID, battery and/or tamper indicators is transmitted in operation 203. A random sleep interval is chosen in operation 204, and the microprocessor sleeps this interval. When the interval has completed, the microprocessor wakes and the process returns to operation 201 where the tag ID is updated and the process starts over.

A separate process related to the tamper detection circuit 101 is also shown in FIG. 2. The tamper detection process may run in parallel with the normal operation process. If the tamper detection circuit detects that the tag has been tampered with (e.g., a tamper circuit has been broken), an interrupt is generated that immediately wakes the microprocessor in operation 205. The sleep time for the microprocessor is reduced (e.g., to a small value) in operation 206. A tamper flag is set in operation 207. The microprocessor resumes its normal operation where it left off in operation 208. Although not shown in FIG. 2, the tamper detection process may detect a low battery condition in addition to the tamper detection or a separate parallel process may be used to detect a low battery condition similar to the tamper detection process shown in FIG. 2.

Figure 3:
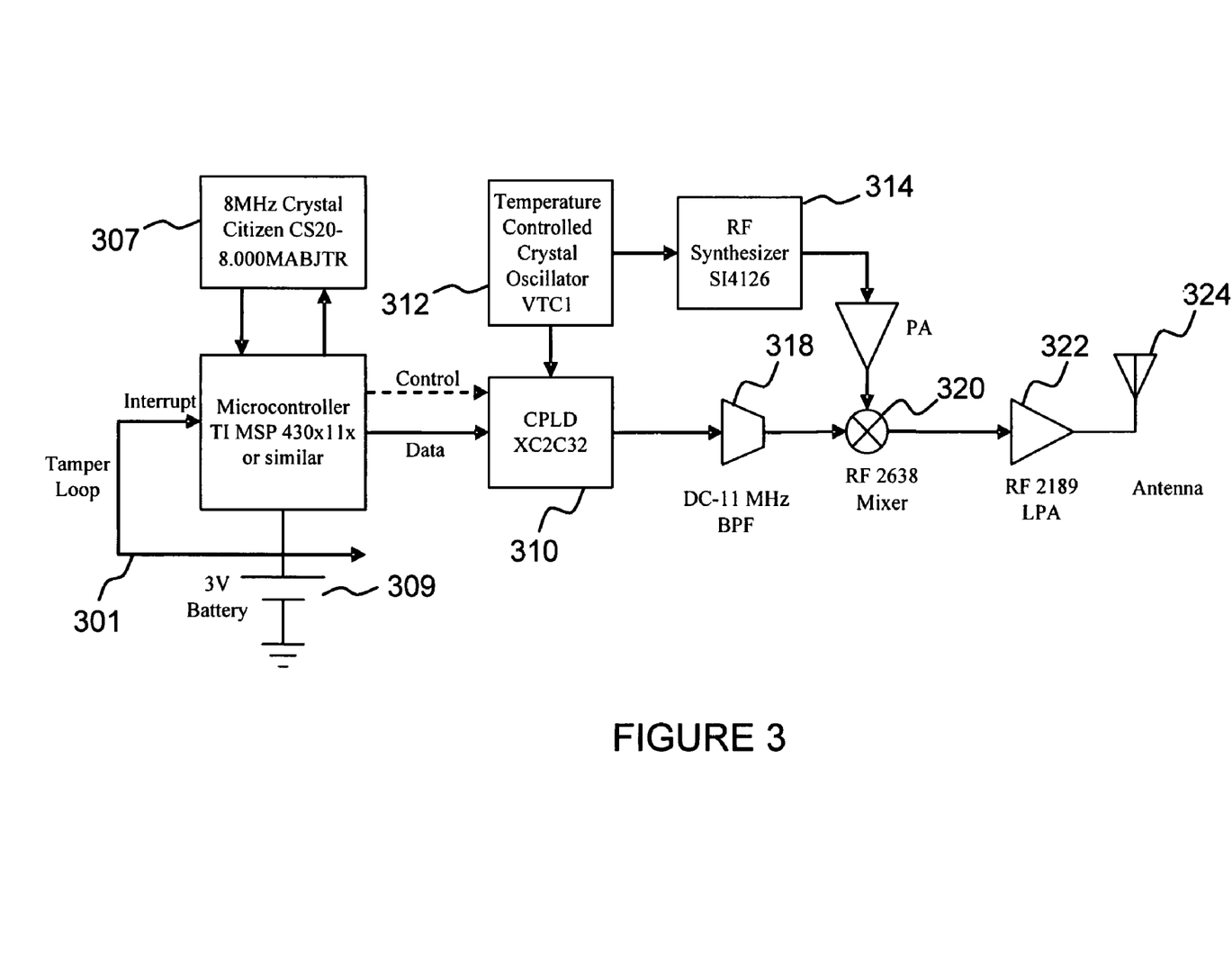
FIG. 3 illustrates a schematic diagram of an exemplary tag.

A schematic diagram of an exemplary embodiment of a tag is shown in FIG. 3. In this embodiment, a microprocessor 305 comprises a Texas Instruments TI 430 line microcontroller. The microcontroller comprises the microprocessor, all necessary RAM and ROM, a clock function (controlled by an external Citizen 8 MHz crystal oscillator 307), digital outputs, interrupt inputs, and power management circuits. Further, the microprocessor comprises sleep mode and interval clocks necessary for low-power operation. A tamper wire loop 301 connects from the battery to an interrupt input of the microcontroller. A power loss on this input causes the microcontroller to wake up and process the tamper interrupt process shown in FIG. 2. The microcontroller also comprises a comparator for detecting a low-battery condition. The microcontroller controls a complex programmable logic device (CPLD) 310, such as a Xilinx XC2C32 line CPLD. The CPLD 302 is clocked by an oscillator 312, such as a temperature controlled oscillator VCTI, which also serves as an input to a frequency synthesizer 314 (e.g. a Silicon Labs SI4126 RF synthesizer). The synthesizer 314 generates a carrier frequency for transmitting a beacon signal. The microcontroller further generates encoded bits that comprise data for the beacon signal. The CPLD 302 then processes the bits and sends them serially at precise intervals to a band pass filter 318 to eliminate sidebands. The output of the band pass filter 318 is then mixed with the carrier frequency in the RF mixer 320 (e.g. an RF Microdevices RF2638). The mixer output is forwarded to an amplifier 322 (e.g. RF Microdevices RF2189). The amplifier 322 output drives an antenna 324. The battery may comprise any of a variety of standard disposable battery types such as a zinc oxide or alkaline battery, may comprise a rechargeable battery, which may be rechargeable via an inductive circuit, for example, or may comprise an alternative energy storage device, such as a capacitor. While this embodiment shows particular components used in the tag, one skilled in the art could readily substitute other components within the scope of the present invention. Further, a multiple chip set may be combined into an application-specific integrated circuit (ASIC) that is used within a tag.

Though this embodiment is specific to sending beacon signals at a specific RF frequency, other embodiments designed to operate at different electromagnetic frequencies including RF, infrared, and optical bands are contemplated by the present invention. Yet other embodiments could use non-electromagnetic signals such as acoustic signals.

Area-Based Localization

In addition to providing a localization tag, the present invention further contemplates systems and methods related to localizing tags within an environment, such as inside of a building. The systems and methods, for example, may use radios based on international wireless networking standards.

Traditional localization uses triangulation. It is characterized by reference points at known locations, and measurements from these references to the target device. Each measurement places the device on a sphere around the reference. The intersection of the spheres determines the device's location. As used in a global positioning system (GPS), a device can be located accurately. Such methods cannot be used indoors. GPS signals do not penetrate well into buildings. Walls, furniture, and other obstructions create a complex signal picture that causes significant measurement errors and failure to localize.

Another triangulation approach measures signal strengths from references placed inside the building. Placing the references inside improves accuracy. If signal strengths fall off consistently with increasing distance, the signal strength can be mapped accurately to distance. But, measurements indoors show that signal strengths are not consistent with distance because of the complex indoor clutter. The mapping to distance can have errors that are a factor of two, i.e. an object at 10 meters will typically map between 5 and 20 meters. This level of error makes triangulation impossible.

Another approach uses the time of arrival or time difference of arrival from reference nodes placed inside a building. The multiple paths from the many surfaces introduce timing errors. The references or the device must be able to measure packet arrivals precisely (within nanoseconds) for indoor accuracy. The references must have clocks synchronized to similar accuracy. In either case the references are expensive and difficult to implement in a standard such as 802.11. These all imply more expensive custom systems. This discussion shows that standard triangulation approaches are not economically feasible indoors.

A better approach to indoor localization uses radio maps. Though the indoor signal propagation is complex, it is consistent. A device and reference separated by a wall will consistently have lower received signal strength than it would without the wall. Thus, the walls and clutter in the radio environment serve to produce unique "radio fingerprints" for each room or area. This suggests that indoor localization to a room is possible in two steps. First, a radio site survey collects fingerprints for each room or area and stores them in a database. Second, this database serves as a reference for future localizations. When a new set of measurements is made between the device and reference, this set is compared with the database until the room with the best match is found. An interesting aspect of this solution is that the precise location of the references is not necessary. Only fingerprints are important; how the references are placed to create the fingerprint is irrelevant regardless of what room, area, or floor they are located in.

System for Localizing Tags

Figure 4:
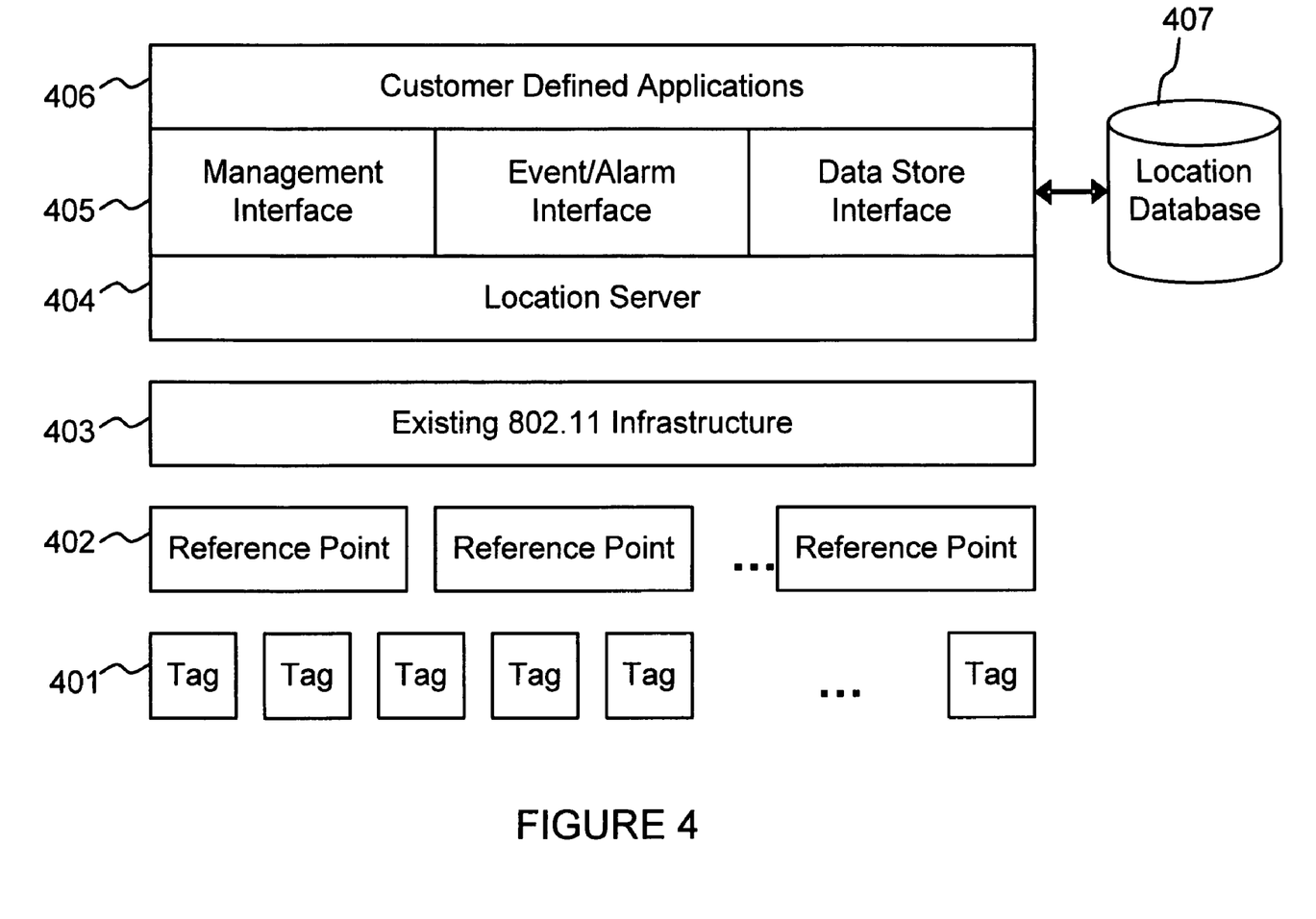
FIG. 4 illustrates an exemplary system for localizing tags.

One embodiment of a system of the present invention is shown in FIG. 4. In this embodiment, the devices localized are tags 401 that periodically transmit beacon signals comprising a packet of information, e.g., an 802.11 packet. They can be transmit-only, to keep them simple and low cost, but may have transmit and receive capacity. References 402 may, for example, comprise standard 802.11 interfaces that listen for beacons from tags. Each reference 402 records the signal strength and ID of every tag beacon signal it receives and adds it to a table of tag ID's seen within the current reporting period. At the end of the reporting period, the reference uses an existing 802.11 network 403 to send the table to a location server 404. At this point the reference starts a new reporting period. The location server 404 correlates the beacon signal measurements collected from different references and compares the beacon signal measurements to the radio survey data to localize the tag. The location server has several interfaces 405. A management interface may, for example, enable survey maps to be entered, the tag list to be modified, and general upkeep of the server application. An event/alarm interface may, for example, define logic for what combinations of tags and locations will generate a response from the location server. For instance, tags assigned to permanent assets that are located outside of their assigned area may generate a warning message. A data store interface may, for example, provide access to a location database 407 with present tag locations and historical data of tags and their location over time. Customer defined applications 406 may also be built on top of these interfaces. Multiple applications can interface with the same location server. For instance, an asset-finder application can allow employees to find assets when they need them while a utilization-analyzer application can allow process engineers to study where assets are located over time.

The location server 404 collects all the reference responses that correspond to a single tag beacon. The vector of which references received a response and the measured signal strength for each reference that did receive a response is denoted a fingerprint. The site survey may comprise many such fingerprints collected over the domain of the location service. These fingerprints contain a high degree of measurement noise and pinpointing the user location is unlikely. Therefore the location service is restricted to locating users to an area. An area may consist of a building, a part of a building, a floor in a building, a part of a floor, an aisle of a store, a room, or a part of a room depending on the size of the facility, the number of references in place, and the needs of the application. Site survey measurements for a given area are collected to produce a model of typical fingerprints for the area. The model comprises the probability of getting a response from a given reference, and statistics such as the mean and variance of measurements given a response. Joint statistics for pairs and larger groups of reference responses can also be included. These statistics can be compared against a new fingerprint to determine the most likely area from which the fingerprint was generated.

This location estimation process can be modified in several ways. First, a priori probabilities that a device is located in any location can be included in the estimate using techniques known to one practiced in the arts. Second, previous tag measurements and location estimates can be included to average out measurement noise. Third, a transition model for the likelihood of a device moving between different areas from one measurement to the next can be incorporated to refine the estimates made over time.

The site survey data can be modified in several ways. First, one or more tags can be placed in an area at fixed locations.

Signals from these tags can serve as benchmarks signals for the area that can be used to modify the area's statistical model over time. These benchmark signals can also indicate when the area statistics have changed sufficiently to invalidate a current model. Such a change might follow the removal or addition of walls in a renovation. The location server would then indicate that a new survey is necessary for the area. Second, measurements that confidently belong to an area can be included in the site survey data to increase the fidelity of the measured model and to allow changes to be tracked over time. Third, the references themselves can be fingerprinted and located using a similar procedure as with tags. If a reference is detected as having moved to a new location or to have stopped transmitting, then its contribution to each area's statistical model can be removed. The location server can also generate an administrative warning when it detects such a change in a reference. Conversely, when a new reference is added or an old reference is moved, the site survey for this reference can be passively collected and added to the site survey data until a sufficient amount has been collected to provide an improvement to the area models.

The present invention can be applied to track tags placed on assets, tags within employee badges, tags on wristbands, and the like. It can also track any standard 802.11 device that can be received by the references. These devices actively send out packets with a unique sender address that are suitable as beacons for the location server.

The references can have several variations. First, the use of 802.11 standards is merely exemplary. The beacon signals sent by tags and received by the references can use other radio technology than 802.11 communication standards such as a custom radio beacon signal that does not follow the 802.11 standard. Second, the references can indirectly use existing 802.11 access points as follows. The tag can send out a beacon signal 802.11 packet that is formatted to appear as an 802.11 Probe Request frame that identifies the tag. 802.11 access points that receive the tag's Probe Request frame will respond with a Probe Response frame that identifies the access point and the sender of the probe request. Reference points that receive the probe response frame can record each access point that responded to the tag's request (and therefore are within range). This information can provide additional information about a tag's location.

Exemplary Applications

The tags and systems for localizing the tags described herein may be used in many different applications. The tags themselves, for example, may be implemented in many form factors such as attachable tags, identification cards, wristbands, and/or credit/debit/gift cards. An attachable tag, for example, may be adhered to or attached to any object, such as a piece of equipment or person, to achieve present or past locations of the object. An identification card may also be used as a form of identification for a person, such as an employee, a visitor or a student, for a room key, or for a guest or participant at a function. A wristband tag may also be used for secure identification of people where present or past location within an area or facility may be of interest. For example, a location of a hospital patient or guest may be monitored within a hospital, amusement park, prison, concert or sporting event. A card, such as a credit, debit, or gift card, can be used to track customers in a retail environment. Such location information may be combined with personal information to provide the ability to offer targeted advertising to such a customer at a desired location. For example, the purchase history of the customer may be used to offer coupons or incentives to a customer while the customer is in a particular aisle or at a display within a store. In addition, a customer may be offered coupons or incentives toward items related to past purchases. A customer that has recently purchased a suit, for example, may be offered coupons or incentives to purchase accessories, such as shoes, belts or ties.

Such tags and localization systems may also be used in various markets or environments such as hospitals, retail, hospitality, homeland security, government or military, schools, concerts, sporting events, amusement parks or various enterprise environments.

An exemplary application of a tag and localization system within the scope of the present invention comprises an asset management and tracking system that identifies, in real time, the current location of critical assets, and provides utilization analytics regarding the historical movement of these assets and asset types. The system can reduce capital costs though better asset utilization, provide perpetual inventories, improve regulatory compliance and allow for efficient deployment of assets and equipment. Another exemplary application comprises an employee/visitor location system that establishes the current location of employees and/or visitors, and provides utilization analytics regarding the historical movement of employees and/or visitors for use in various analyses. The system, for example, may monitor the employee's and/or visitor's positions within a facility and protect other employees and facilities against unauthorized access to restricted areas. The system may also maintain historical records for these analyses. A further exemplary application comprises a security and safety solution that provides an entity's staff, security, and law enforcement agencies the capability to locate and monitor the position of the wearer of the tag or devices in the event of a security or safety incident. Yet another application may comprises a location based service that provides users and equipment customized to their location, such as printing to the nearest or most convenient printer, music that follows the tag wearer around his or her home, automated museum docent applications and the like.

Healthcare applications, for example, may comprise asset management and utilization analytics that identify, in real time, the current location of critical assets, and provide utilization analytics regarding the historical movement of these assets and asset types. The system can reduce capital costs though better asset utilization, provide perpetual inventories, improve regulatory compliance and allow for efficient deployment of assets and equipment. Work flow optimization may also comprise tracking people, objects and/or staff to increase efficiency in operating systems and businesses. Maintenance and inventory management applications may also provide location information to enable inventory management including on-time preventative maintenance and detection of unauthorized removal of equipment from a facility.

Security applications may be used to track staff, patients and visitors to provide increased security capabilities. A patient security and safety solution, for example, may provide a hospital staff, security and/or a law enforcement agency the capability to locate and monitor the position of patients, in the event of an elopement or security incident. A visitor location system may be used to monitor visitors' positions throughout a facility, thereby protecting employees and facilities against unauthorized access to restricted areas.

Retail applications, such as consumer presence detection, may provide for real-time identification of when a particular consumer has entered a store and track their shopping patterns within the store. Such an application may provide valuable information regarding frequency of visits to the store, traffic patterns and buying habits. One-to-one marketing may also be used once the presence of a consumer is detected to send relevant messages to the consumer with promotional or marketing information. Work force optimization applications may comprise understanding historical consumer patterns and in-store location of employees to improve employee assignment and allocation. An employee location system application may establish current locations of employees, and provide utilization analytics regarding the historical movement of employees for use in various analyses. The system may maintain historical records for these analyses. A theft detection system may also detect the presence and/or location of a stolen credit card. This information can be used to avoid acceptance of the card or by authorities to recover the card.

Hospitality applications may include, for example, asset management and utilization analytics that identify, in real-time, the current location of critical assets, and provide utilization analytics regarding the historical movement of these assets and asset types. The system can reduce capital costs though better asset utilization, provide perpetual inventories, improve regulatory compliance and allow for efficient deployment of assets and equipment. Work flow optimization applications may be used to track people, objects and/or staff to increase efficiency in operating systems and businesses. Guest services applications may be used to provide instant identification of when a particular guest enters a hotel or facility enabling a new class of service offerings to enhance the customers experience and increase loyalty. Theft deterrent applications may provide location information to enable inventory management including on time preventative maintenance and detection of unauthorized removal of equipment from a facility. Security applications may establish the current location of employees and/or guests in the event of a security incident as well as the historical movement for use in utilization analytics. The system may maintain historical records for future analyses.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

We claim:

1. A localization tag comprising:
   at least one memory circuit for storing beacon information, said beacon information comprising a number of ID codes, at least one tamper code, at least one power status code, and;
   a tamper circuit capable of triggering additional beacons if said tag has been compromised;
   a microprocessor for creating a beacon signal comprising at least one piece of said beacon information,
   a transmitter capable of transmitting said beacon signal, said transmitter being capable of sending said beacon signal in randomly selected or predetermined time intervals; and
   a power supply operatively connected to said microprocessor, said tamper circuit, said memory circuit, and said transmitter,
   wherein said tag transmits an ID code that changes from beacon to beacon in a predetermined sequence.

2. The localization tag in claim 1, wherein said transmitter is adapted to transmit the beacon signal comprising one of the group of: (a) a duty cycle comprising less than about one in a thousand or (b) a duration chosen from a statistical distribution.

3. The localization tag in claim 1, wherein the tag is disposed of when a battery is drained and a low-battery status is determined by either the power status code or by a predicted time interval.

4. A localization tag comprising:
   at least one memory circuit for storing beacon information, said beacon information comprising a number of ID codes, at least one tamper code, at least one power status code, and;
   a tamper circuit capable of triggering additional beacons if said tag has been compromised;
   a microprocessor for creating a beacon signal comprising at least one piece of said beacon information,
   a transmitter capable of transmitting said beacon signal, said transmitter being capable of sending said beacon signal in randomly selected or predetermined time intervals; and
   a power supply operatively connected to said microprocessor, said tamper circuit, said memory circuit, and said transmitter,
   wherein said tag transmits said beacon signal at varying signal strengths as determined by said tag microprocessor and said transmitted signal strength is indicated by either a code included in said signal beacons, or a sequence of transmitted signal strengths that can be predicted.

5. The localization tag in claim 1, wherein said beacon signal is generated by any electromagnetic or non-electromagnetic means.

6. A localization system comprising:
   at least one localizing tag where said tag sends out a beacon signal;
   at least one reference point for receiving beacon signals and collecting information about said received beacon signals;
   a localization server for computing a location of a tag to a predefined area based on a site survey comprising a radio map and the beacon information collected by the at least one reference point, wherein the radio map comprises a signal strength;
   a communication infrastructure for transmitting said beacon information from the at least one reference point to a localization server.

7. The localization system in claim 6, wherein the tag location information is stored in a database.

8. The localization system in claim 6, further comprising at least one interface configured to maintain said location server.

9. The localization system in claim 6, wherein said at least one interface defines responses to at least one specific tag location event.

10. The localization system in claim 6, wherein said location computation is augmented by at least one of the following:
    prior likelihoods for an area and tag combination;
    previous tag measurements and location estimates; and
    a transition model for the likelihood of a tag moving between different areas from one measurement to the next.

11. The localization system in claim 6, wherein said site survey is augmented by at least one of the following:
    beacons from reference tags included in known areas;
    beacon information that confidently belongs to an area; and
    localizing said reference points.

12. The localization system in claim 6, further comprising:
    at least one device other than said tags capable of emitting a signal operably configured for location by said system.

13. The localization system in claim 6, wherein said beacon signal is a radio packet formatted to appear as an 802.11 packet.

14. The localization system in claim 13, wherein said radio packet is a prove request.

15. The localization system in claim 6, wherein said beacon signal is generated by electromagnetic or non-electromagnetic means.

16. The localization system in claim 6, wherein said signal strength comprises a received signal strength measured by the at least one reference point.

17. The localization system in claim 6, wherein said signal strength comprises a signal strength transmitted by the at least one localizing tag.

18. The localization system in claim 6, wherein the at least one localizing tag is identified by a predetermined sequence of ID codes that change from beacon to beacon.

19. The localization tag in claim 4, wherein said transmitter is adapted to transmit the beacon signal comprising one of the group of: (a) a duty cycle comprising less than about one in a thousand or (b) a duration chosen from a statistical distribution.

20. The localization tag in claim 4, wherein the tag is disposed of when a battery is drained and a low-battery status is determined by either the power status code or by a predicted time interval.

* * * * *